(12) United States Patent
Tanaka et al.

(10) Patent No.: US 6,731,721 B2
(45) Date of Patent: *May 4, 2004

(54) TELEPHONE EXCHANGE APPARATUS

(75) Inventors: Toshiaki Tanaka, Tokyo (JP);
Nobuhiro Masaki, Tachikawa (JP);
Shuji Fujitsuka, Hino (JP); Takashi Aoki, Tokorozawa (JP)

(73) Assignee: Kabuhsiki Kaisha Toshiba, Kawasaki (JP)

( * ) Notice: Subject to any disclaimer, the term of this patent is extended or adjusted under 35 U.S.C. 154(b) by 176 days.

This patent is subject to a terminal disclaimer.

(21) Appl. No.: 09/783,562

(22) Filed: Feb. 15, 2001

(65) Prior Publication Data

US 2001/0028702 A1 Oct. 11, 2001

Related U.S. Application Data

(63) Continuation of application No. 08/994,647, filed on Dec. 19, 1997, now Pat. No. 6,243,442.

(30) Foreign Application Priority Data

Dec. 20, 1996 (JP) .............................. 8-341213
Feb. 10, 1997 (JP) .............................. 9-026311
Mar. 28, 1997 (JP) .............................. 9-077337

(51) Int. Cl.$^7$ ............................................ H04M 11/04
(52) U.S. Cl. ............................. 379/45; 379/37; 379/50; 379/93.05
(58) Field of Search .............................. 379/37, 46, 45, 379/50, 93.26, 156, 157, 196, 197, 198, 243, 244, 245

(56) References Cited

U.S. PATENT DOCUMENTS

| 4,243,845 A | 1/1981 | Feinberg et al. ............ 379/355 |
| 4,408,102 A | 10/1983 | Lumpkin ............... 379/101.01 |
| 5,235,630 A | 8/1993 | Moody et al. |
| 5,239,570 A | 8/1993 | Koster et al. ................. 379/32 |
| 5,311,569 A | 5/1994 | Brozovich et al. ....... 379/93.14 |
| 5,347,568 A | * 9/1994 | Moody et al. ................ 379/45 |
| 5,602,901 A | 2/1997 | Redden et al. .............. 455/404 |
| 5,734,698 A | 3/1998 | Kobayashi et al. ........... 379/45 |

FOREIGN PATENT DOCUMENTS

| EP | 0512704 A2 | 11/1992 |
| JP | 63-9399 | 1/1988 |
| JP | 63-164790 | 7/1988 |
| JP | 8-32703 | 2/1996 |

* cited by examiner

*Primary Examiner*—Melur Ramakrishnaiah
(74) *Attorney, Agent, or Firm*—Finnegan, Henderson, Farabow, Garrett & Dunner, L.L.P.

(57) ABSTRACT

The emergency call such as Enhanced 911 call or the like is also originated through an exchange such as PBX (Private Branch Exchange). In this case, the identification information such as the extension number of the extension telephone terminal connected to the PBX should be transmitted to a network corresponding to the emergency call. For the extension telephone terminal, it is necessary to unhook or to capture an arbitrary line by the line key, before inputting the dial data "911". Independent of the capture of arbitrary line, the PBX searches a vacant line connected to the network corresponding to the emergency call, captures the vacant line, transmits the identification information such as the extension number, and switches over and connects the extension telephone terminal from the line captured by the terminal to the vacant line. The identification information such as the extension number is notified, not by the DTMF (Dual Tone Multi-frequency) signal expressing data corresponding to the number of dial key, but by using a MF (Multi-frequency) signal expressing more data.

8 Claims, 19 Drawing Sheets

FIG.5

| LINE NO. | |
|---|---|
| 1 | 00 |
| 2 | 00 |
| 3 | 01 |
| ∼ | |
| 200 | 00 |

FIG.6

| LINE NO. | | | | | | | | |
|---|---|---|---|---|---|---|---|---|
| 1 | | | | | | | | |
| 2 | | | | | | | | |
| 3 | 9 | 1 | 1 | | | | | |
| 4 | | | | | | | | |

```
                    NO. 105
NOV  15  FRI  03:25
```

FIG.9

(9A)
```
DIAL  STATION  NO.
OR  ACCESS  CODE
```

INPUT DIAL [9]

(9B)
```
                          9
```

INPUT DIAL [1]

(9C)
```
                         91
```

INPUT DIAL [1]

(9D)
```
USING  LINE  3
EMERGENCY  CALL
```

FIG.10

(10A)
```
USING ␣ LINE        1
DIAL ␣ TEL ␣ NUMBER
```

INPUT DIAL [9]

(10B)
```
                    9
ABR    CONF    PGE
```

INPUT DIAL [1]

(10C)
```
                   91
ABR    CONF    PGE
```

INPUT DIAL [1]

(10D)
```
USING ␣ LINE ␣ 3
EMERGENCY ␣ CALL
```

US 6,731,721 B2

TELEPHONE EXCHANGE APPARATUS

This is a continuation of application Ser. No. 08/994,647, filed Dec. 19, 1997 now U.S. Pat. No. 6,243,442, which is incorporated herein by reference.

BACKGROUND OF THE INVENTION

1. Technical Field of the Invention

The present invention relates to an exchange such as PBX (Private Branch Exchange) composed to allow to conveniently execute emergency call such as Enhanced 911 call.

2. Related Art

FIG. 17 shows a system for emergency call composed using PBX 10. In this system, an E911 unit 4 to be connected to a CAMA (Centralized Automatic Message Accounting) line 7, one of corresponding lines for realizing an Enhanced 911 call (called E911 call, hereinafter), is connected to the outside of the PBX 10, to be used as adapter of the PBX 10 and the CAMA line 7.

Here, an E911 call is an emergency call (911 call) of which function is enhanced. According to this E911 call, it is adopted an approach wherein caller ID information or the like are sent to a station upon originating of an emergency call and the station obtains the caller location information based on this information, apprising facilities for emergency, where fire-fighting or similar emergency team is watching, of this information. As a consequence, the emergency team can arrive at the origin of call without fail.

The E911 unit 4 is an interface for transmitting the caller ID or others via the CAMA line 7 and is provided with a procedure for sending the caller ID (MF tone signal) to the station via T1 (digital) or TIE (bus) line or the like.

To the PBX 10 of FIG. 17 are connected an degital key telephone 2 and a standard telephone set 3 and, on the other hand, it is connected to the E911 unit 4 via a general purpose bus 6 such as TIE line, and is connected to the public network (PSTN) 5 via respective lines. The 911 unit 4 is connected to a 911 Tandem Office 8 via the CAMA line 7.

Moreover, the PBX 10 comprises a control section 11 including a time switch 111, a transmitting and receiving interface 12, a digital line interface 13, a DKT (digital key telephone) interface 14, a standard telephone set interface 15, and a station line interface 16, the control section 11 and respective interfaces 12 to 16 being connected by a PCM highway (speech highway) L1 and a data highway L2.

In addition, the E911 unit 4 is composed as shown in FIG. 18. The E911 unit 4 includes a receipt detector 61 for detecting a call-in from the PBX 10, a dial detector 62 for detecting dial data of DTMF signal originated from the PBX 10, a CPU 63 for supervising and controlling operations of the E911 unit 4 and a CAMA line interface 64 to be connected to the CAMA LINE 7. Plural elements other than the CPU 63 are provided with so as to allow simultaneously a plurality of E911 calls from the PBX 10.

Upon arrival of a call-in signal from the PBX 10, the call-in detector 61 detects it and inform the CPU 63 of receipt detection. Now, the CPU 64 waits that an extension number allocated to an extension telephone terminal sent by the PBX 10 be detected by the dial detector 62. This extension number serves as an ANI (Automatic Numbering Identification) signal corresponding to the caller location information. Upon the detection of the transmitted extension number by the dial detector 62, the CAMA line interface 64 closes the CAMA line 7, sends a connect signal to 911 Tandem Office 8 and, moreover, transmits the extension number (ANI) detected. Owing to this, the 911 Tandem Office 8 obtains the caller location information based on this information and apprises facilities for emergency, where fire-fighting or similar emergency team is attending, of this information. At the same time, the PBX 10 will be connected to the CAMA line 7 via the call-in detector 61 and the CAMA line interface 64, enabling the emergency call.

The emergency call operation by the PBX 10 mentioned above will be described in reference to the flow chart of FIG. 19. Upon a dial input (S501) via the DKT interface 14 from the digital key telephone 2, the control section 11 of the PBX 10 determines whether it is an E911 call or not (S502). In other words, if "911" is dial-input, it constitutes an E911 call, originating the step S503 to capture a trunk leading to the E911 unit 4 through the digital line interface 13 (S503).

At that time, the control section 11 determines whether there is or not a vacancy in the CAMA line interface 64 inside the E911 unit 4 (S504), and if there exists the vacancy, calls in the E911 unit 4 and then change an ANI signal including ID information of the digital key telephone 2 into a DTMF signal and transmits the DTMF signal to the E911 unit 4 via the general purpose bus 6 for performing an E991 call (S505).

Here, the ANI corresponding to the caller location information is registered in the control section 11 of the PBX 10 in response to the extension telephone. The E911 unit 4 receives the ANI signal transmitted from the PBX 10, converts it into MF tone signal and sends it to the 911 Tandem Office 8 through the CAMA line 7. The 911 Tandem Office 8 has the composition for retrieving the database of caller location information ALI (Automatic Location Information) corresponding to the ANI signal and for delivering, from this information, an emergency message communication to a firehouse or the like nearest to the caller. Therefore, it can advantageously transmit surely and rapidly where an emergency message has been generated, without calling a PSAP (Public Safety Answering Point).

In the step S502 of FIG. 19, if it is determined that it is not an E911 call, a call processing using the public network (PSTN) 5 shall be performed by the station interface 16 (S506). On the other hand, in the step S504, if there is no vacancy in the CAMA circuit interface 64, an ordinary emergency call processing to call the nearest firehouse or the like using the public network 5 by the station line interface 16 shall be performed (S507).

As mentioned above, when an E911 call is to be made from the PBX 10 using the E911 unit 4, if the CAMA circuit interface 64 in the E9 11 unit 4 is occupied, the E911 call can not be made, even if there exists an interface (such as transmitting and receiving interface 12) connected to an E911 call corresponding line by MF signal, because the PBX 10 is lacking for MF signal source though it includes a mechanism for transmitting a DTMF signal. To resolve this inconvenience, it has been necessary to dispose an MF signal source in the PBX 10.

FIG. 20 shows a block diagram of the control section 11 provided with a MF signal source. In this example, an MF tone generation circuit 114 for generating more various MF tones than the dial key corresponding DTMF tone is added to the control section 11 in the PBX 10, in addition to a DTMF tone generation circuit 113 for generating dial key corresponding DTMF tone, for increasing the kind of tones. Here, the tone output time range in respect to a PCM highway L1 being limited by a main CPU 112, the main CPU 112 will be loaded heavily.

For example, an MF tone output from the MF tone generation circuit 114 will be arranged to the channel 0

(CH0) to the channel 31 (CH31) as shown in (21A) of FIG. 21, to be transmitted as input stream for MF tone. There, the time switch 111 outputs to the channel 2 and thereafter in the PCM highway L1 having channel 0 (CH0) to channel 31 (CH31), and this stream is shown by (21B) of FIG. 21. Here, the digit output time interval of MF tone is defined to 60 mS±0.5 mS, so it becomes difficult to control the time interval when the main CPU 112 is loaded heavily.

Moreover, the PBX 10 will includes a MF signal source in addition to the MF signal source provided in the E911 unit 4; as a consequence, it will be redundant to have double MF signal source in a system. On the other hand, as the E911 unit 4 is connected to the PBX 10 outside, when E911 call can not originated through the E911 unit 4, it is necessary to verify whether the fault is due to the E911 unit 4 to network side, or to the general purpose bus 6, or to the PBX 10, increasing the time and work for restoration. Technology concerning such emergency call is disclosed in U.S. Pat. No. 5,235,630 or Japanese Patent Application 6-168318 (Publication No. 8-32703).

SUMMARY OF THE INVENTION

The present invention has been made to solve problems mentioned above and intends to provide a telephone exchange apparatus capable of conveniently executing an emergency call to a line corresponding to the Enhanced 911 call. Moreover, it avoids the redundancy of providing double MF signal source. Additionally, it always maintains the digit output time interval of MF tone signal with a high accuracy. When E911 call is disabled, it facilitates to localize the cause. Moreover, it selects automatically a line corresponding to the emergency call to perform an emergency call. On the other hand, it transmits automatically the identification information of an extension telephone terminal when an emergency call is made.

A telephone exchange appratus according to the present invention comprises an extension interface corresponding to an extension to which an extension telephone terminal is connected, an MF signal source for converting data into MF tone data, an interface connected to a line corresponding to an emergency call MF tone signal, a signal generation means for generating an emergency call data upon inputting a dial signal of emergency call from the extension telephone terminal and for transmitting the generated data to the MF signal source to convert into an emergency call MF tone signal, and a transmission means for sending the emergency call MF tone signal obtained by this signal generation means to the interface to transmit the same to a line corresponding to the emergency call MF tone signal.

By the telephone exchange appratus of the composition, upon the input of a dial signal of emergency call from an extension telephone terminal, an emergency call data is generated, which will be converted into emergency call MF tone signal and sent to the interface, and a appropriate emergency call shall be made to a line corresponding to the emergency call MF tone signal.

A telephone exchange appratus according to the present invention comprises an extension interface corresponding to an extension to which an extension telephone terminal is connected, an MF signal source for converting data into MF tone data, an interface connected to a line corresponding to an emergency call MF tone signal, a line interface connected to a line corresponding to emergency call, a signal generation means for generating an emergency call data upon the input of a dial signal of emergency call from the extension telephone terminal and for transmitting the generated data to the MF signal source to convert into emergency call MF tone signal, and a transmission means for sending the emergency call MF tone signal obtained by this signal generation means to the interface to transmit the same to a line corresponding to the emergency call MF tone signal, or for sending it to the line interface to transmit to the line corresponding to the emergency call.

By the telephone exchange appratus of the composition, upon the input of a dial signal of emergency call from an extension telephone terminal, an emergency call data is generated, which will be converted into emergency call MF tone signal and sent to a line corresponding to the emergency call MF tone signal or to a line corresponding to the emergency call, and an appropriate emergency call shall be made to the line corresponding to the emergency call MF tone signal, or to the line corresponding to the emergency call.

A telephone exchange appratus according to the present invention comprises an extension interface corresponding to an extension to which an extension telephone terminal is connected, an MF signal source for converting data into MF tone data, a line interface connected to a line corresponding to emergency call, a signal generation means for generating an emergency call data upon the input of a dial signal of emergency call from the extension telephone terminal and for transmitting the generated data to the MF signal source to convert into an emergency call MF tone signal, and a transmission means for sending the emergency call MF tone signal obtained by this signal generation means to the line interface to transmit the same to a line connected to this line interface.

By the telephone exchange appratus of the composition, upon the input of a dial signal of emergency call from an extension telephone terminal, an emergency call data is generated, which will be converted into an emergency call MF tone signal and sent from the line corresponding to the emergency call, and an appropriate emergency call shall be made to the line corresponding to the emergency call.

A telephone exchange appratus according to the present invention comprises an extension interface corresponding to an extension to which an extension telephone terminal is connected, a first line interface connected to a line corresponding to emergency call, a second line interface connected to a line not corresponding to the emergency call, an emergency dial determination means for determining, upon the input of a dial data after the capturing operation of the extension, the first line or the second line, from the extension telephone terminal, whether the dial data corresponds to a dial number for emergency call or not, a line capture switching means for releasing an actually captured line and for capturing the first line, when this emergency dial determination means determines that an input corresponding the dial number for emergency call has been made, and a dial data transmission means for transmitting the dial data for emergency to the first line captured by this line capture switching means through the first line interface.

By the telephone exchange appratus of the composition, upon the input of a dial data after the capturing operation of the extension, the first line or the second line, from the extension telephone terminal, it is determined whether the dial data corresponds to a dial number for emergency call or not, and when it is determined that an input corresponding the dial number for emergency call has been made, the actually captured line will be released, the first line shall be captured and the dial data for emergency be transmitted to ensure an appropriate emergency call to the first line.

A telephone exchange appratus according to the present invention comprises an extension interface corresponding to an extension to which an extension telephone terminal is connected, a line corresponding interface to which an emergency call unit is connected, a determination means for determining whether a dial data input from the extension telephone terminal is a data corresponding to a given number, and a transmission means for calling the emergency call unit from the interface when this determination means determines that it is a data corresponding the given number and, for transmitting the identification information of the extension telephone terminal to the emergency call unit through the line corresponding interface when a response signal returns from this emergency call unit.

By the telephone exchange appratus of the composition, when it is determined that a dial data input from an extension telephone terminal is a data corresponding to the given number, the emergency call unit shall be called out and the identification information of the extension telephone terminal be sent to the emergency call when a response signal returns from this emergency call unit to perform an appropriate emergency call processing to the emergency call unit.

BRIEF DESCRIPTION OF THE DRAWINGS

FIG. 5 illustrates the stored content of a selected line number memory section of the PBX according to the second embodiment of the present invention.

FIG. 6 illustrates the stored content of a dial memory section for special line of the PBX according to the second embodiment of the present invention.

FIG. 8 shows an example of indication of the waiting state of an extension telephone terminal connected to the PBX according to the second embodiment of the present invention.

FIG. 9 shows the progress of indication from extension capture to emergency call by an extension telephone terminal connected to the PBX according to the second embodiment of the present invention.

FIG. 10 shows the progress of indication from station line capture to emergency call by an extension telephone terminal connected to the PBX according to the second embodiment of the present invention.

DETAILED DESCRIPTION OF THE INVENTION

Figure 1:
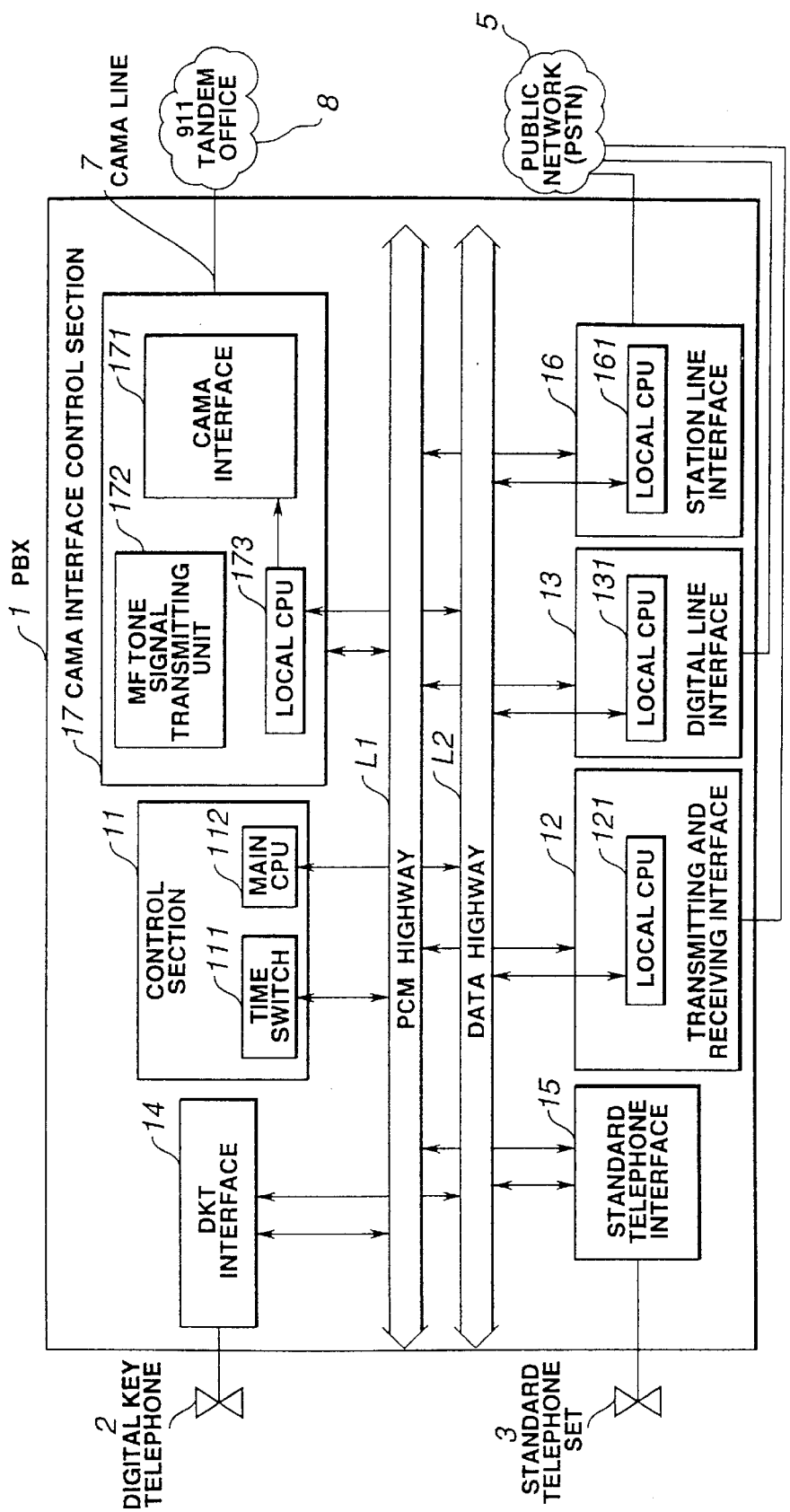
FIG. 1 is a composition diagram of a PBX according to a first embodiment of the present invention.

FIG. 1 is a composition diagram illustrating an embodiment of a PBX 1. A digital key telephone 2 and a standard telephone set 3 are connected to the PBX 1. On the other hand, the PBX 1 is connected to a public network (PSTN) 5 and to a 911 Tandem office 8.

Moreover, the PBX 1 comprises a control section 11 having a time switch 111 and a main CPU 112, a transmitting and receiving interface 12, a digital line interface 13, a DKT interface 14, a standard telephone set interface 15, a station line interface 16, and a CAMA interface control section 17. The control section 11 and respective interfaces 12 to 17 are connected by a PCM highway L1 and a data highway L2. The CAMA interface control section 17 includes a CAMA interface 171 connected to a CAMA circuit 7, a MF tone signal transmission unit 172 which is MF signal source and a local CPU 173 for supervising and controlling the CAMA interface control section 17.

The station line interface 16 presents a unit for two-wire type analog public line (CO: Central Office), and the direct current polarity of two wires is fixed. On the other hand, the CAMA interface 171 presents a unit for a line (CAMA line) where the polarity inversion detection function is added to the public line mentioned above and the direct current polarity of two wires varies, to detect the line state through the polarity inversion.

When "911" is dial-input from the disital key telephone 2, a dial data corresponding to "911" is sent to the DKT interface 14, converted, here, into call processing data for sending to the control section 11 and sent to the main CPU 112 in the control section 11 through the data highway L2. The main CPU 112 acknowledges that "911" dial input has been made by the digital key telephone 2. There, the control section 11 connects with the DKT interface 14 through the PCM highway L1 by the time switch 111, in order to ensure a voice communication rout.

On the other hand, when "911" is dial-input from the standard telephone set 3, a DTMF tone signal corresponding to "911" is sent to the standard telephone set interface 15, converted into PCM data and sent to the main CPU 112 in the control section 11 through the PCM highway L1. The main CPU 112 acknowledges that "911" dial input has been made by the standard telephone set 3. For ensuring a voice communication rout, there, the control section 11 connects with the standard telephone interface 15 through the PCM highway L1 by the time switch 111, in order to ensure the voice communication rout.

In the foregoing, the main CPU 112 in the control section 111 which has acknowledged that an E911 call had been originated by dial input of "911" requests a line capture processing to the local CPU 121 in the CAMA interface control section 17 through the data highway L2, in order to originate call from the CAMA interface 171 of the CAMA interface control section 17. Moreover, if required, the main CPU 112 requests the line capture processing to the local CPU 121 in the transmitting and receiving interface 12 or the local CPU 131 in the digital circuit interface 13, through the data highway L2, in order to transmit from the transmitting and receiving interface 12, or the digital circuit interface 13.

The main CPU 112 in the control section 11 requests MF tone signal sending processing to the local CPU 173 in the CAMA interface control section 17, through the data highway L2. In other words, it transfers the data for E911 call (including ANI signal) to the MF tone signal transmitting unit 172. The MF tone signal transmitting unit 172 converts the data for E911 call into PCM code data corresponding to MF tone signal, for transmitting the same to the PCM highway L1. This PCM code data is sent to the time switch 111 in the control section 11. This PCM code data is converted into analog signal or digital signal corresponding to the line by a selected line interface corresponding to the emergency call (either of CAMA interface 171, transmitting and receiving interface 12 or digital line interface 13) and sent to the line as MF tone signal.

Figure 2:
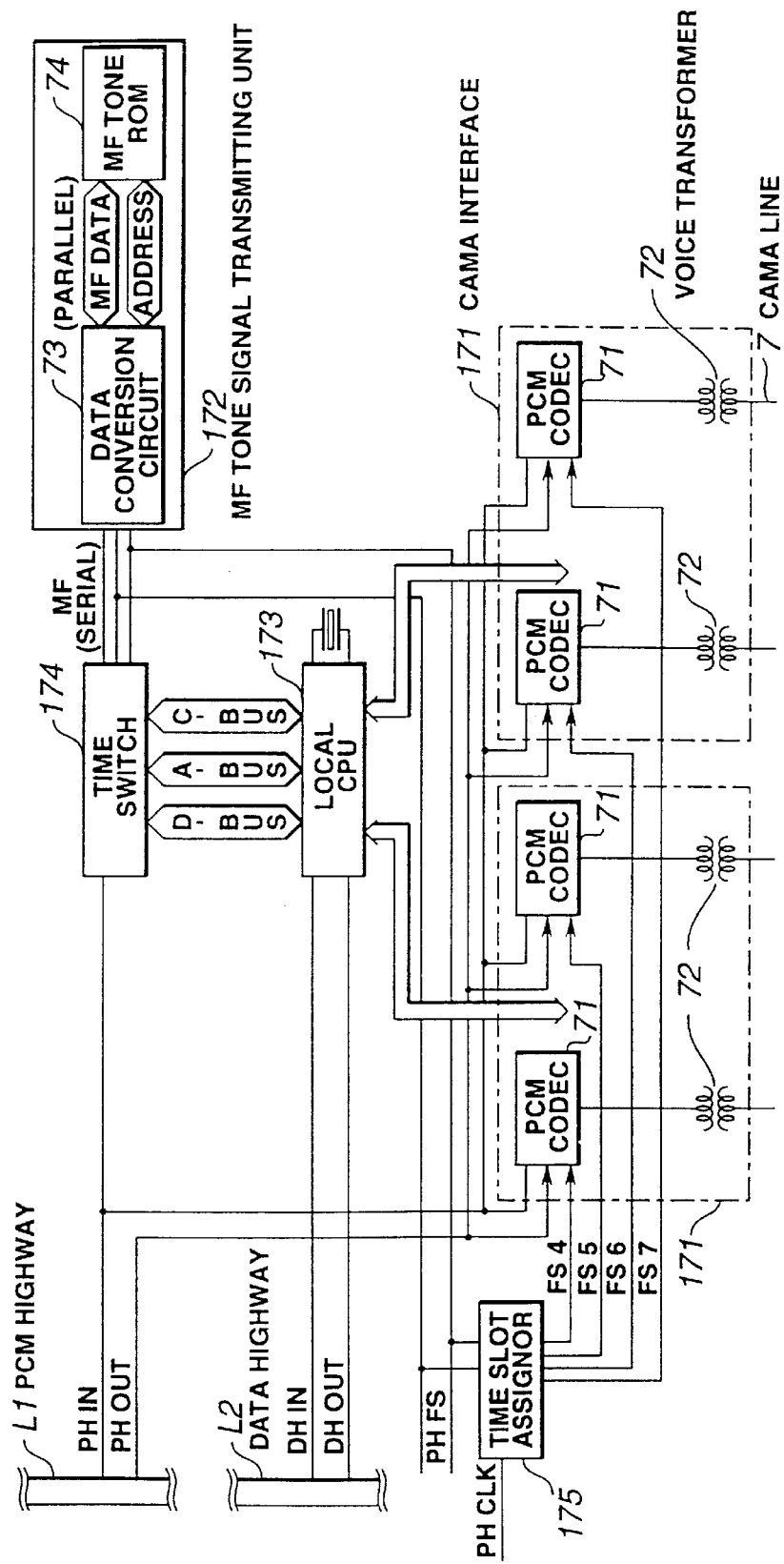
FIG. 2 is a composition diagram of a CAMA interface control section of the PBX according to the first embodiment of the present invention.

FIG. 2 shows a detailed composition block diagram of the CAMA interface control section 17. The MF tone signal transmitting unit 172 includes a data conversion circuit 73 to parallel/serial convert the incoming data and to serial/parallel convert the sending data and a MF tone ROM 74 as MF signal source. The MF tone ROM 74 is a memory table capable of reading out MF tone data corresponding as address to various numbers or character data.

When an ANI signal or other data from the control section 11 is given to the local CPU 173 through the data highway L2, the local CPU 173 transmits it to the data conversion circuit 73 of the MF tone signal transmitting unit 172. The data conversion circuit 73 converts the ANI signal or other serial data into parallel data and accesses the MF tone ROM 74 as address data. By this, MF tone data corresponding to the given address data will be output from the MF tone ROM 74. This MF tone data being parallel data, it is converted into serial data by the data conversion circuit 73, output to the PCM highway L1 via the time switch 174 and sent to the control section 11.

In the foregoing, when MF tone data is output from the CAMA interface control section 17, the local CPU 173 controls the switching of the time switch 174 to establish the digit output time interval (60 mS±0.5 mS) of the MF tone data. Different from the main CPU 112 supervising and controlling the PBX 1, the local CPU 173 only controls the CAMA interface control section 17 and does not constitute a heavy load in comparison to the main CPU 112, so the digit output time interval of MF tone data can be maintained very accurately.

Figure 3:
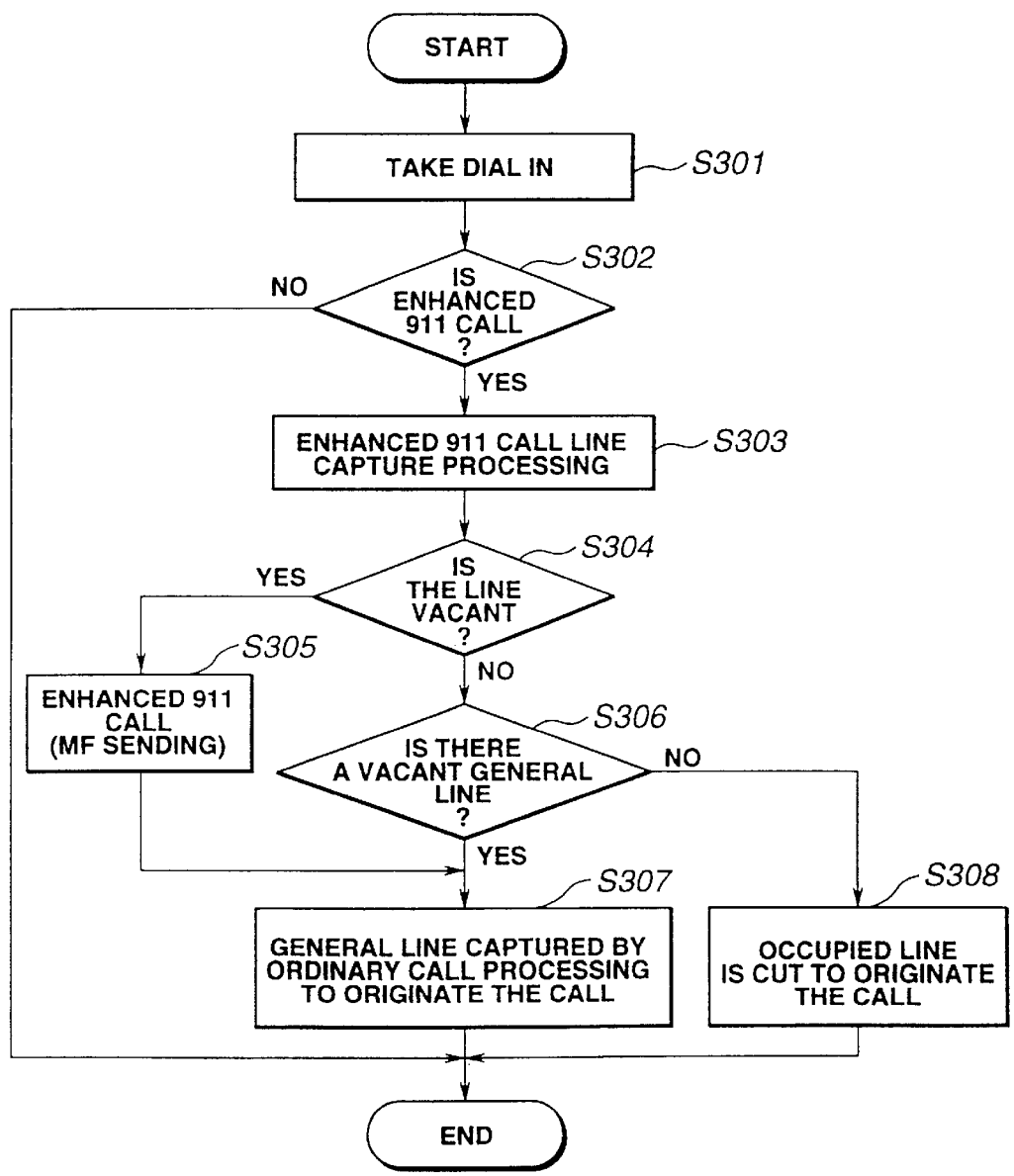
FIG. 3 is a flow chart showing the operation of the PBX according to the first embodiment of the present invention.

In the control section 11 of the PBX 1 composed as mentioned, the E911 call is processed according to the flow chart as shown in FIG. 3, so now this will be described. When a dial is input from the digital key telephone 2 or the standard telephone set 3, the control section 11 takes it in (S301) and determines whether it is an E911 call or not (S302). Here, when it has determined that "911" had been dial input from the digital key telephone 2 or the standard telephone set 3 and constituted an E911 call, the control section 11 determines whether there exists a vacant line in the interface corresponding to the E911 call (CAMA interface 171, transmitting and receiving interface 12 or digital line interface 13) (S304). The vacancy detection of the respective lines shall be performed in the order of CAMA interface 171, transmitting and receiving interface 12 and digital line interface 13. If any one of these lines is vacant, the control section 11 captures that line, converts data for E911 call into MF tone signal by the MF tone signal transmitting unit 172 and sends the obtained MF tone data to the interface corresponding to the captures line for performing the E911 call (S305).

In the foregoing, if there exists a vacant line in the CAMA interface 171, the main CPU 112 of the control section 11 sends a line processing request of CAMA interface 171 to the CAMA interface control section 17 with data for E991 call (including ANI signal) through the data highway L2. Receiving it, the CAMA interface control section 17 captures the vacant line of the CAMA interface 171. Data for E911 call (including ANI signal) is converted into MF tone data by the MF tone signal transmitting unit 172, sent to the control section 11 through the PCM highway L1 and then sent from the time switch 111 in the control section 11 to a PCM CODEC 71 of the CAMA interface 171. The PCM CODEC 71 converts the MF tone data into analog MF tone signal using synchronization signal and clock signal from a time slot assignor 175 to send the same to the CAMA line 7 through a voice transformer 72.

On the other hand, if there is no vacant line in the CAMA interface 171, the main CPU 112 in the control section 11 sends a line processing request through the data highway L2 to the local CPU in the corresponding interface, in order to capture a vacant line in the transmitting and receiving interface 12 or in the digital line interface 13 corresponding to E911 emergency call. At the same time, the control section 11 requests, via the data highway L2, to the local CPU 173 in the CAMA interface control section 17 to convert into MF tone data, with data for E911 call (including ANI signal).

The control section 11 sends the MF tone data sent by CAMA interface control section 17 through the PCM highway L1 (MF tone data corresponding to data for E911 call (including ANI signal)) to the interface corresponding to the vacant line then captured (transmitting and receiving interface, for instance 12) through the PCM highway L1, by swithing the time switch 111. The transmitting and receiving interface 12 is provides with a PCM CODEC and converts the MF tone data sent through the PCM highway L1 into analog MF tone signal and sends to the line.

Here, if an E911 call is to be made through the digital line interface 13, the digital line interface 13 transforms the MF tone data sent from the PCM highway L1 into a form appropriate for the digital line and sends the same to the digital line.

If all lines corresponding to the E911 call are occupied, it is determined whether there is a vacancy in lines (station line) connected to the station interface 16 (S306), and if there exists a vacancy, it proceeds to the step S307, and if there is none, it proceeds to the step S308. If it proceeds to the step S307, the control section 11 performs the call by capturing the vacant line connected to the station line interface 16 by the ordinary call protocol and sending "911" dial data. In other words, the control section 11 sends the line selection request to the local CPU 161 in the station line interface 16, however it means it is treated as 911 call and not as E911 call. On the other hand, if it proceeds to the step S308, the occupied line connected to the station line interface 16 is cut through the station interface 16 to create a vacant line by force and this vacant line is captured to perform the call by sending "911" dial data.

According to the present embodiment, by providing the MF tone signal transmitting unit 172 as MF signal source and the CAMA interface control section 17 including the CAMA interface 171, the E911 call can be performed by connecting directly to the CAMA line 7. As a consequence, the E911 call be performed without E911 unit 4, even when the E911 call is unavailable, an emergency call can be performed conveniently by switching over to the 911 call using the general line (station line). Moreover, the E911 unit 4 being absent, fault may occur either in this PBX 1 or the network side over the CAMA line 7 and, if a fault is not localized in the PBX 1, the fault would have occurred in the network side over the CAMA line 7; so the fault can be localized more easily and the restoration can be realized more rapidly than the case where the E911 unit 4 is connected outside the PBX.

Figure 17:
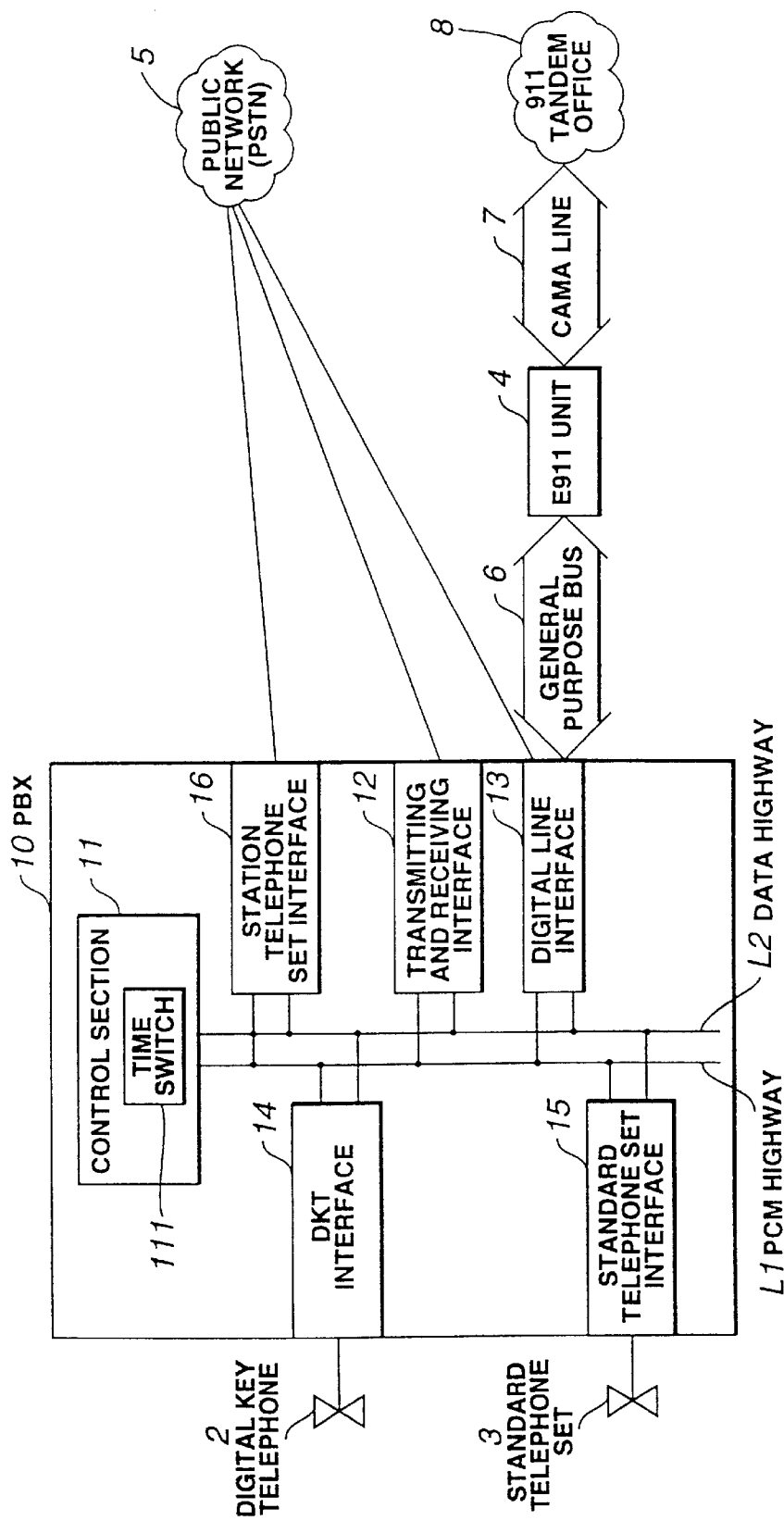
FIG. 17 is a composition diagram of an emergency call system using PBX for illustrating the prior art of the present invention.

Furthermore, the effect can be expected by adding only the CAMA interface control section 17 to the PBX 10 as shown in FIG. 17, and to support the CAMA line 7, the CAMA interface 171 can be installed advantageously in extension as the option of the MF tone signal transmitting unit 172. The other way around, if the CAMA line is not to be supported, by providing a composition where the CAMA interface 171 is absent in the CAMA interface control section 17, not only the MF signal source can be used common for the lines corresponding to the E911 call, but also it may correspond to the service using the MF tone signal or the like.

Note that, the equipment cost can be reduced by composing a PBX provided with the CAMA interface control section 17 and the station line interface 16, without including the transmitting and receiving interface 12 and the digital line interface 13 as shown in FIG. 1. With such PBX also, the E911 call can be performed without using the E911 unit 4, and even when the E911 call is disabled, it can be switched over to the 911 call using the general line (station line) and, in case of trouble, it can be localized either in the PBX or the network side beyond the CAMA line 7, so the fault can be identified easily and the restoration can be performed rapidly just as in the case of the PBX 1 as shown in FIG. 1.

Figure 4:
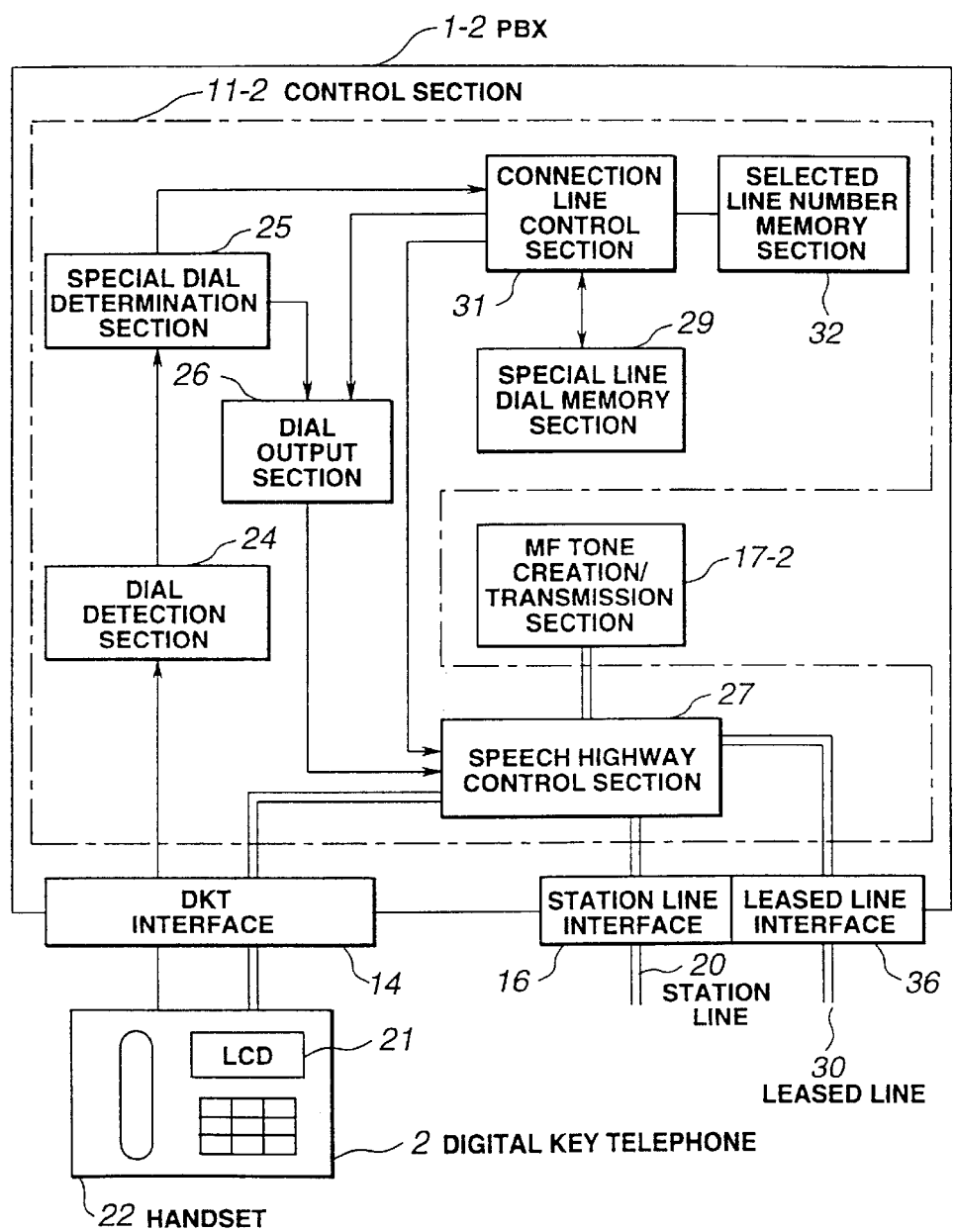
FIG. 4 is a composition diagram of a PBX according to a second embodiment of the present invention.

FIG. 4 shows a PBX 1–2 of the second embodiment. This PBX 1–2 is connected to a station line (C0) 20 and a leased line 30. The leased line 30 is, for example, a line connected between users, not corresponding neither the E911 call nor the 911 call. Consequently, the emergency call shall be made through the station line 20. The station line (C0) 20 and the leased line 30 are respectively a plurality of lines including, for instance, 200 lines in total. The station line interface 16 is connected to the station line 20 and the leased line interface 36 is connected to the leased line 30.

While it is only shown the DKT interface 14 to which the digital key telephone 2 is connected, the standard telephone set interface 15 to which the standard telephone set 3 is connected is not to be excluded. A control section 11-2 corresponds to the control section 11 of the PBX 1 and its functions are shown by block. A speech highway control section 27 corresponds to the time switch 111 in the control section 11 of the PBX 1. An MF tone generating/transmitting section 17-2 corresponds to a composition of the CAMA interface control section 17 of the PBX 1 without the CAMA interface 171.

The digital key telephone 2 comprises a LCD 21 as display section or a handset 22. A control section 11-2 includes a selected line number memory section 32 storing previously the line number of the line corresponding to the emergency call, and a dial memory section for special line 29 previously storing the data of the dial number to be transmitted, corresponding to the line number of the line corresponding to the emergency call. Flags are disposed corresponding to the line number (No.) in the selected line number memory section 32, as shown in FIG. 5, and composed to enable the retrieval of the line to be captured in case of emergency call. Here, the line of the line number "3" is supposed to be the line corresponding to the emergency call. As shown in FIG. 6, the dial memory section for special line 29 stores previously the data of the dial number to be transmitted in case of emergency call, in response to the line number (No.). Here, it is shown that the data of the dial number "911" should be transmitted to the line of the line number "3".

The control section 11-2 comprises a dial detection section 24 for detecting the dial to be input from the key telephone 2, and a special dial determination section 25 for determining whether the dial number detected by the dial detection section 24 is a special dial of the emergency number "911". Upon the detection of the special dial of the emergency number, the special dial determination section 25 gives an instruction to a connection line control section 31 to read out the line number from the selected line number memory section 32. The connection line control section 31 accesses a dial memory section for special line 29 by the read out line number and, at the same time, affords the read out line number to a speech highway control section 27 to cut the communication channel of the line already closed with the DKT interface 14 and, also, opens a new communication channel between the line of the read out line number and the DKT interface 14.

When the special dial determination section 25 detects a dial data other than the special dial of the emergency number, the dial data will be given to the dial output section 26. On the other hand, to the dial output section 26 will be given the data of the dial number to be transmitted for the emergency call which has been read out from the connection line control section 31 by the dial memory section for special line 29. The dial output section 26 transforms these data into a form to be transmitted through the speech highway for transmitting to the speech highway control section 27. The data sent from the dial output section 26 will be dispatched from the speech highway control section 27 to an MF tone creation/transmission section 17-2 and the MF tone creation/transmission section 17-2 converts the same into a corresponding MF tone, which will be sent from the speech highway control section 27 to an interface corresponding to the line newly captured as mentioned above.

Figure 7:
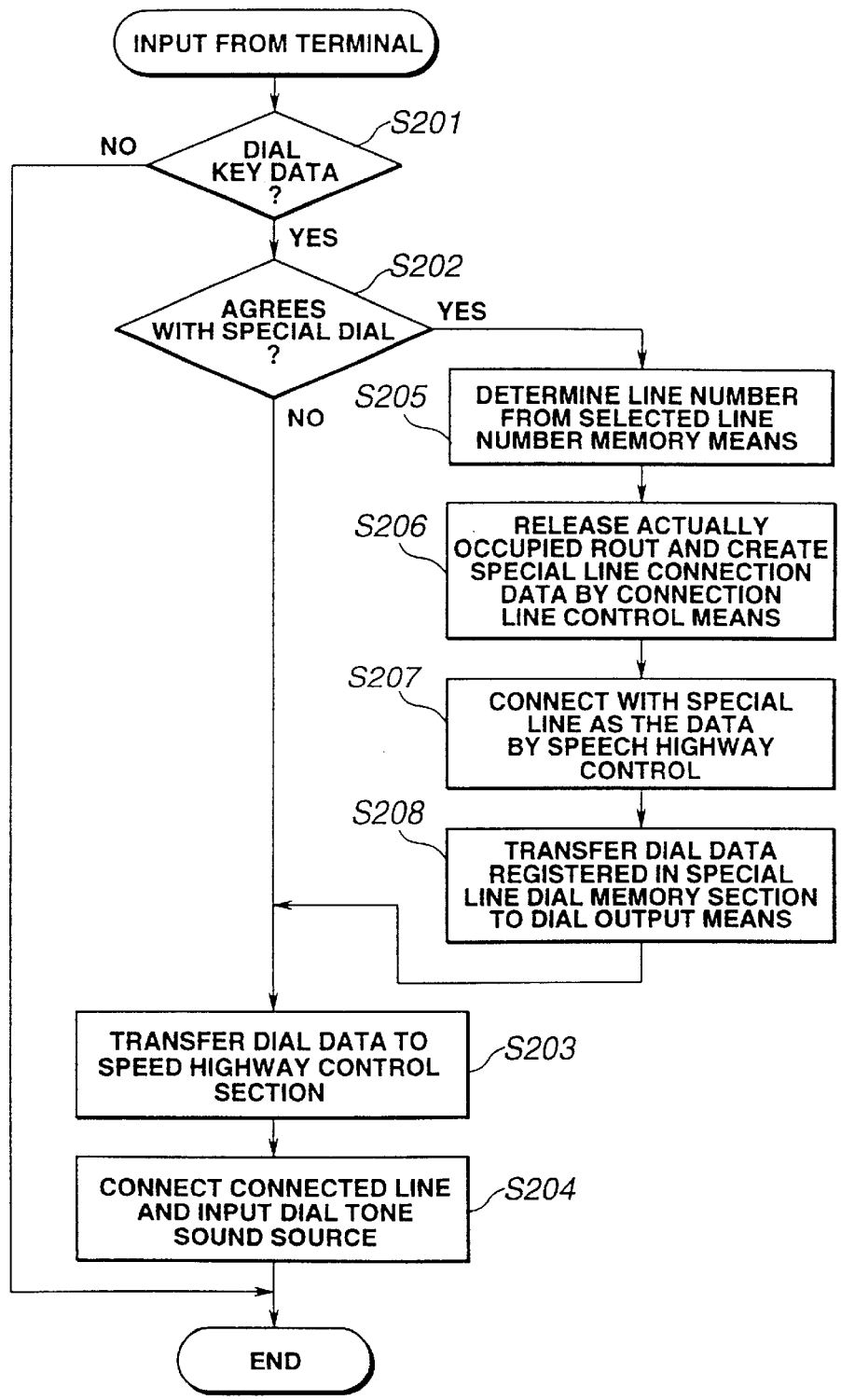
FIG. 7 is a flow chart showing the operation of the PBX according to the second embodiment of the present invention.

The digital key telephone 2, in waiting state before any key operation or the raising operation of the handset 22 or the like in any way, displays the extension number (105) of the terminal, date, current time or the like on the LCD 21 as shown in FIG. 8. To originate an emergency call, the user of the digital key telephone 2 operates the station line key, the leased line key or the extension key disposed on the digital key telephone 2 to capture the station line 20, the leased line 30 or the extension, or to unhook the handset 22 to capture the extension. By this, the PBX 1–2 will perform the operations according to the program shown in the flow chart of FIG. 7; so now these operations shall be described. Meanwhile, the LCD 21 of the digital key telephone 2 prompts to input the extension number of the destination or the access code as shown in FIG. 9 (9A).

The dial detection section 24 monitors whether a dial data is sent from the DKT interface 14 (S201). Upon the transmission of the dial data, the dial data detection section 24 sends this dial data to the special dial determination section 25. The special dial determination section 25 determines whether the dial data delivered from the dial data detection section 24 agrees with the given emergency dial number "911" (110, 119 in Japan) (S202), and if they disagree, supplies the dial output section 26 with the dial data, and if they agree, activates the connection line control section 31. In the foregoing, when the user of the digital key telephone 2 inputs the leading "9" of the dial number "911" for emergency call from the dial key, the LCD 21 of the digital key telephone 2 displays the input number "9" as shown in FIG. 9 (9B) and further, when he/she inputs "1" from the dial key, the LCD 21 of the digital key telephone 2 displays the already input two digit number "91" as shown in FIG. 9 (9C).

If the dial data delivered from the dial data detection section 24 agrees with the given emergency dial number "911", the connection line control section 31 accesses the selection line number memory section 32 to read out the line number (No) to be captured by the line interface (S205). Here, as the line number "3" is stored in the selection line number memory section 32, the line number "3" will be obtained. Moreover, the connection line control section 31 creates the release data of the line actually captured by the digital key telephone 2 and the data of the line number "3" of the line to be connected and sends these data to the speech highway control section 27 (S206).

The speech highway control section 27 controls the station interface 16 and the leased line interface 36 to release the actually released line and switches over to capture the line of the line number "3" to be connected (S207). Here, as the leased line 30 is not corresponding to the emergency call, the line of the line number "3" of the station line 20 will be captured. The connection line control section 31 accesses the dial memory section for special line 29 to read out the dial data (here, "911" corresponding to the line number 3, as shown in FIG. 6) to be transmitted from the line number "3" for sending to the dial output section 26 (S208).

The dial output section 26 transforms the transmitted dial data "911" into a form to be transferred by the speech highway and outputs to the speech highway control section 27 (S203). The speech highway control section 27 sends the arriving dial data "911" to the MF tone creation/transmitting section 17-2, converts the dial data "911" into the corresponding MF tone and, at the same time, connects this MF tone creation/transmitting section 17-2 and the station line interface 16 through the speech highway in a way to send the MF tone of "911" from the line 20 of the line number "3" (S204). By this, the emergency call shall be originated using the line of the line number "3" appropriate for the emergency line. At this time, the LCD 21 of the digital key telephone 2 displays that the emergency call being originated using the line of the line number "3" as shown in FIG. 9 (9D).

By the way, when the user operates the station line key of the digital key telephone 2 for originating an emergency call, in the LCD 21 of the digital key telephone 2, the display is performed to prompt the input of the telephone number of the destination as shown in FIG. 10 (10A). There, if the user of the digital key telephone 2 inputs the leading "9" of the dial number "911" for emergency call from the dial key, the LCD 21 of the digital key telephone 2 displays the input number "9" as shown in FIG. 10 (10B), and further, when he/she inputs "1" from the dial key, the LCD 21 of the digital key telephone 2 displays the already input two digit number "91" as shown in FIG. 10 (10C). And when the user has input whole the dial number "911" for the emergency call, the processing mentioned above shall be performed and the LCD 21 of the digital key telephone 2 displays that the emergency call being oroginated using the line of the line number "3" as shown in FIG. 10 (10D).

In the foregoing, upon the reception of dial data unrelated with the emergency call, the dial output section 26 transforms such dial data "911" into a form to be transferred by the speech highway and outputs to the speech highway control section 27 (S203). The speech highway control section 27 transmits the arriving dial data to the MF tone creation/transmitting section 17-2, converts this dial data unrelated with the emergency call into the corresponding MF tone and, at the same time, connects this MF tone creation/transmitting section 17-2 and the station line interface 16 through the speech highway in a way to transmit the MF tone corresponding to the ordinary dial data from the line already captured (S204).

According to the present embodiment, when the user wants to originate the emergency call, he/she is only required to capture the line by the off-hook by unhooking the hand set 22 of an extension terminal or the operation of the extension key, the station line key or the leased line key and to key input the dial data for emergency call for releasing once the actually captured line and then capturing the line for emergency call to originate the emergency call. As a consequence, when the user wants to originate the emergency call, the user has only to key-input the dial data for emergency call without paying attention to the kind of line to be captured. Consequently, even when the user is flustered, he/she can originate the emergency call rapid and securely, and this advantage is quite remarkable. Note that, a plurality of lines may be provided for the emergency call, though it was supposed to be one line in this example. Moreover, the control section 11-2 controls the capture inhibition so that the line for emergency call may not be captured by an ordinary call.

Figure 11:
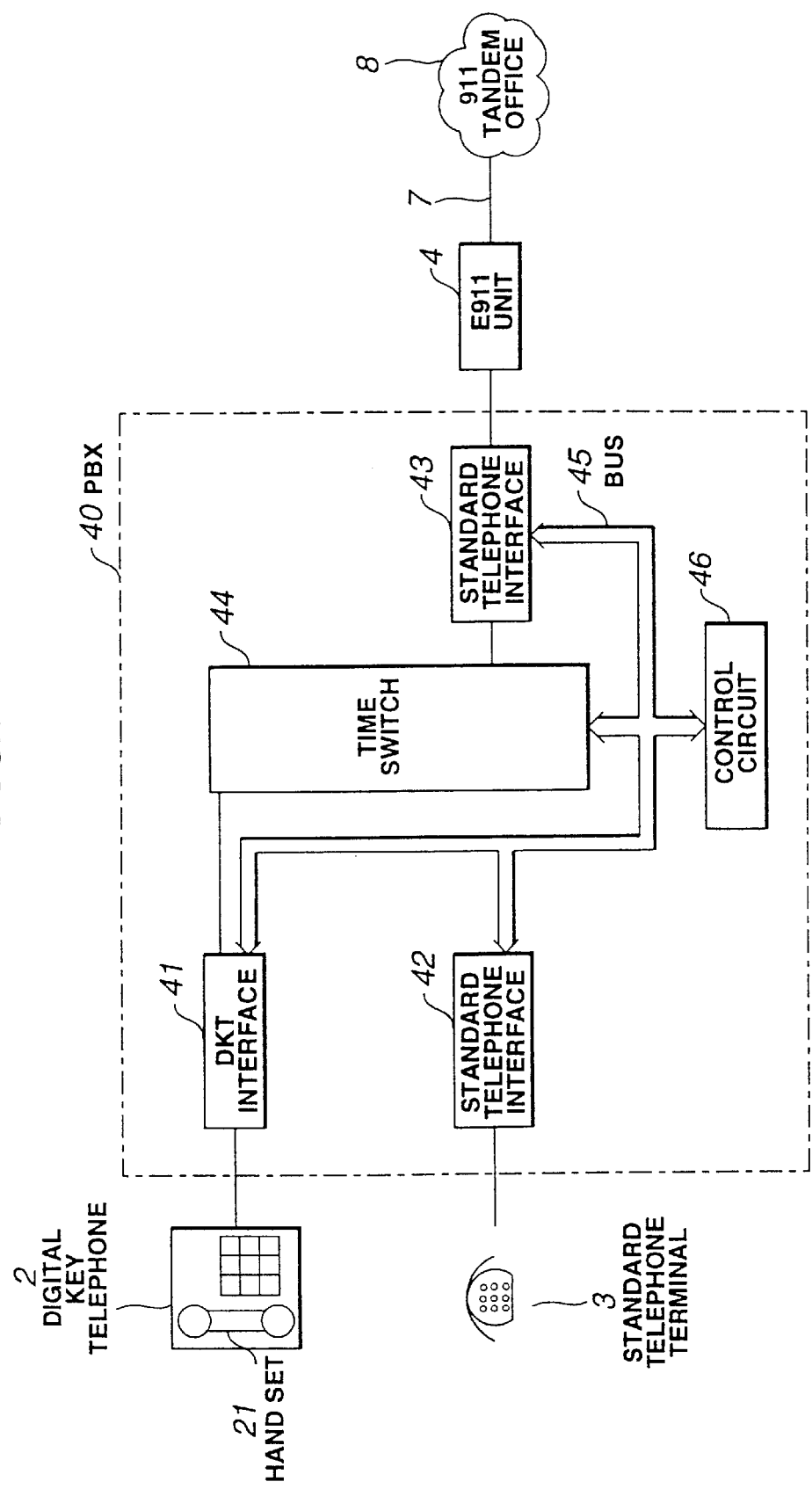
FIG. 11 is a composition diagram of a PBX according to a third embodiment of the present invention.

FIG. 11 shows the PBX 40 of the third embodiment. In the composition of the PBX 40, the control section 45 controls the DKT interface 41, the standard telephone interface 42, 43 and the time switch 44 through the bus 46.

Figure 18:
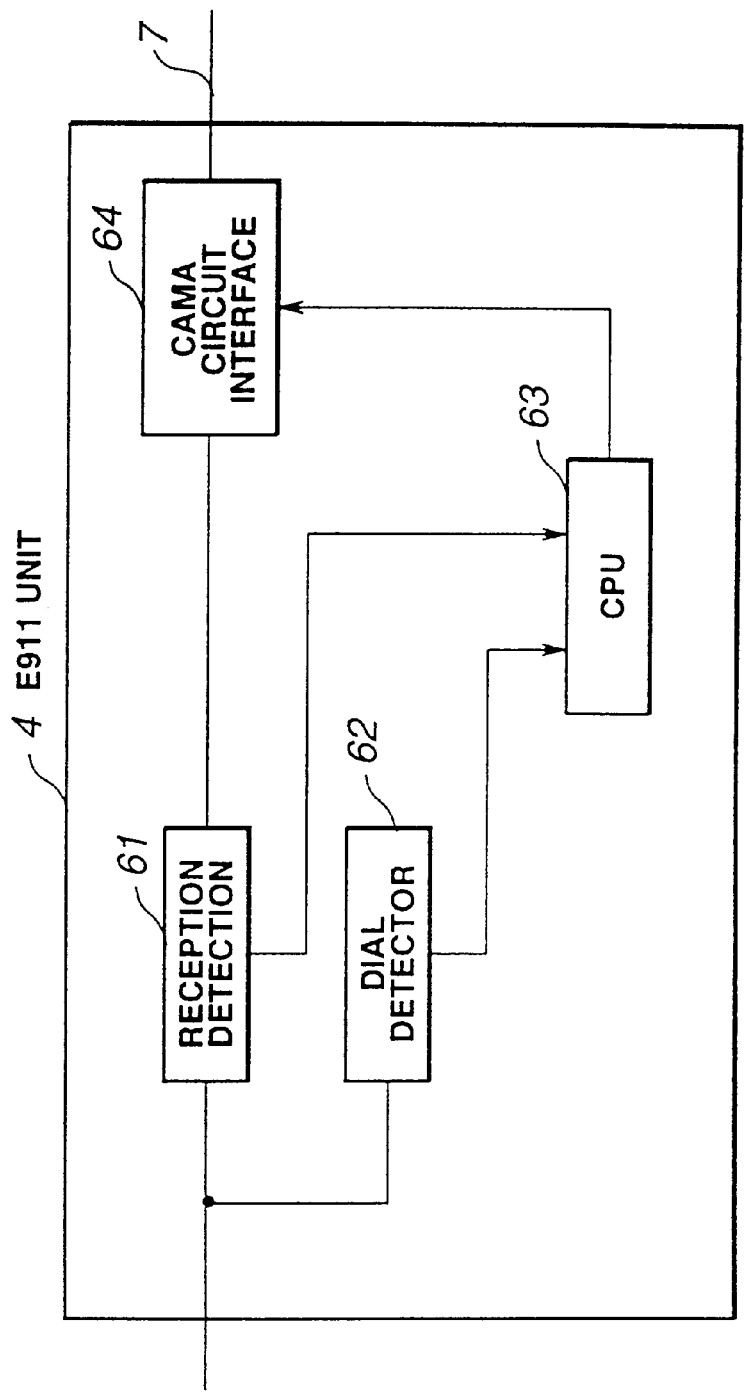
FIG. 18 is a composition diagram of an E911 unit used for performing an E911 call.
Figure 19:
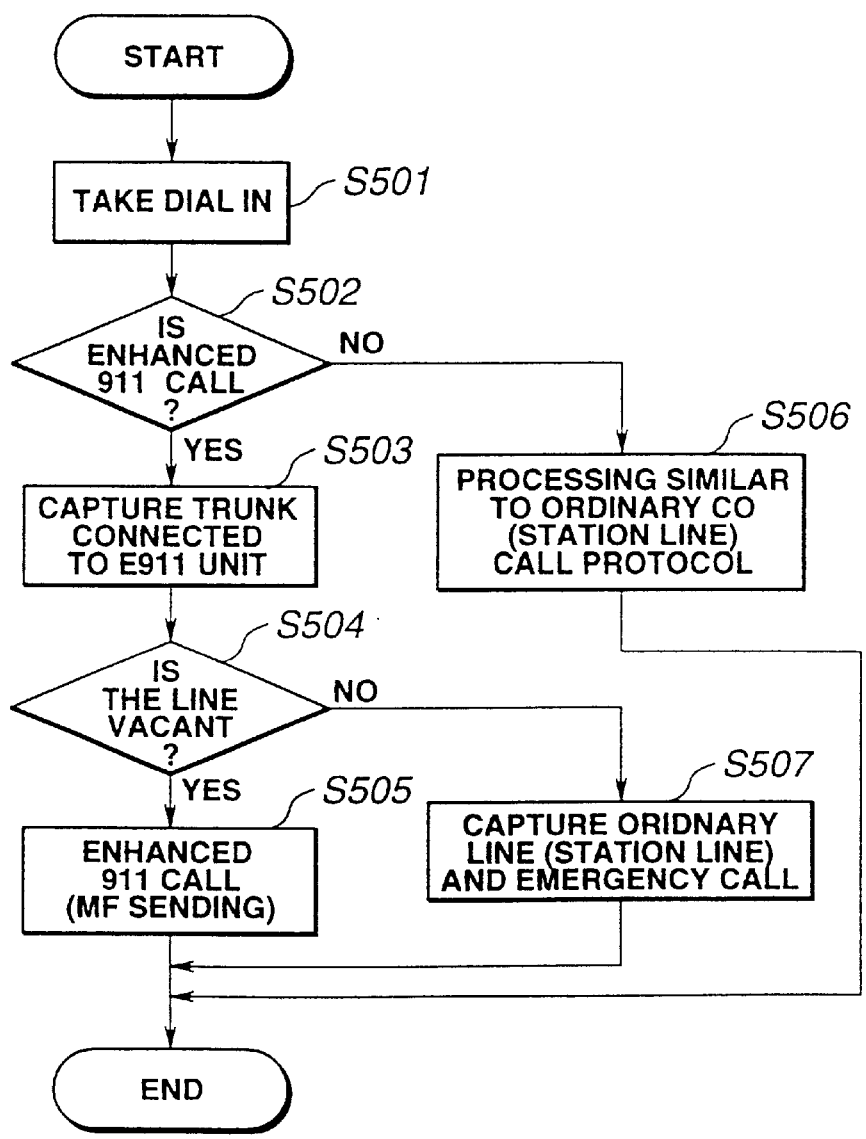
FIG. 19 is a flow chart for illustrating the emergency call operation by the system shown in FIG. 17.
Figure 20:
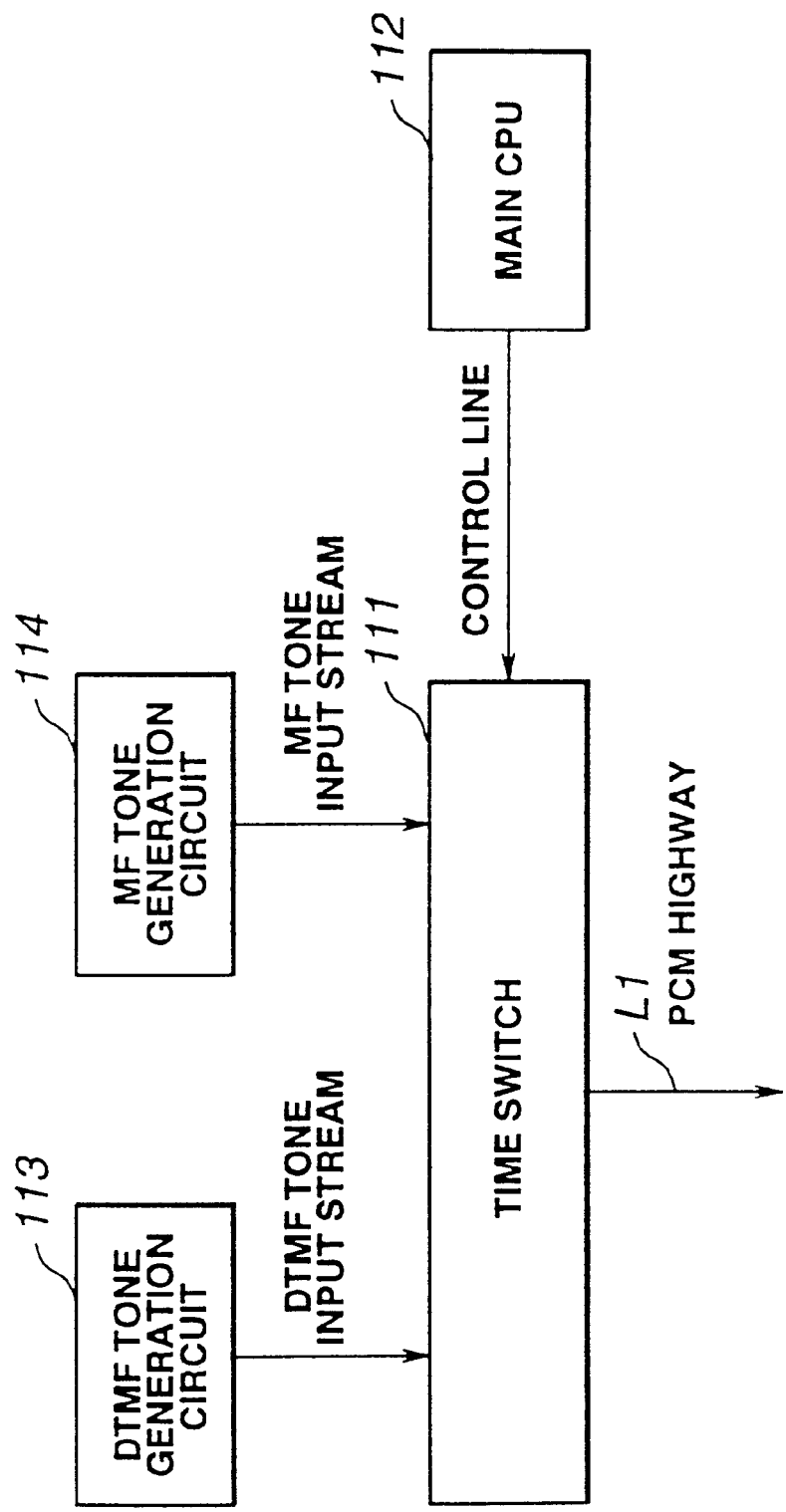
FIG. 20 is a composition diagram of the PBX shown in FIG. 17 wherein the control section has been improved.
Figure 21:
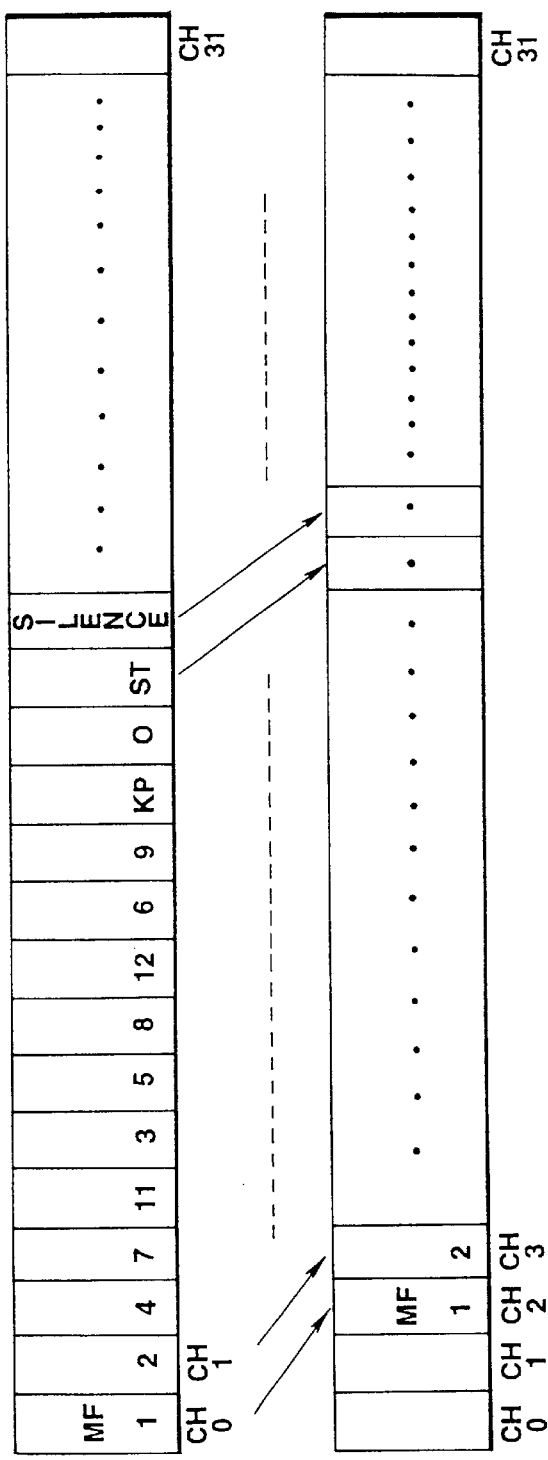
FIG. 21 shows the time switch operation by the control section of FIG. 20.

The digital key telephone 2 is connected to the DKT interface 41, the standard telephone set 3 to the standard telephone interface 43 and the E911 unit 4 to the standard telephone interface 43. The E911 unit 4, apparatus described in FIG. 18, transmits and receives signal to/from the standard telephone interface 43 like the standard telephone set 3. The E911 unit 4 is connected to the 911 Tandem office 8.

Figure 12:
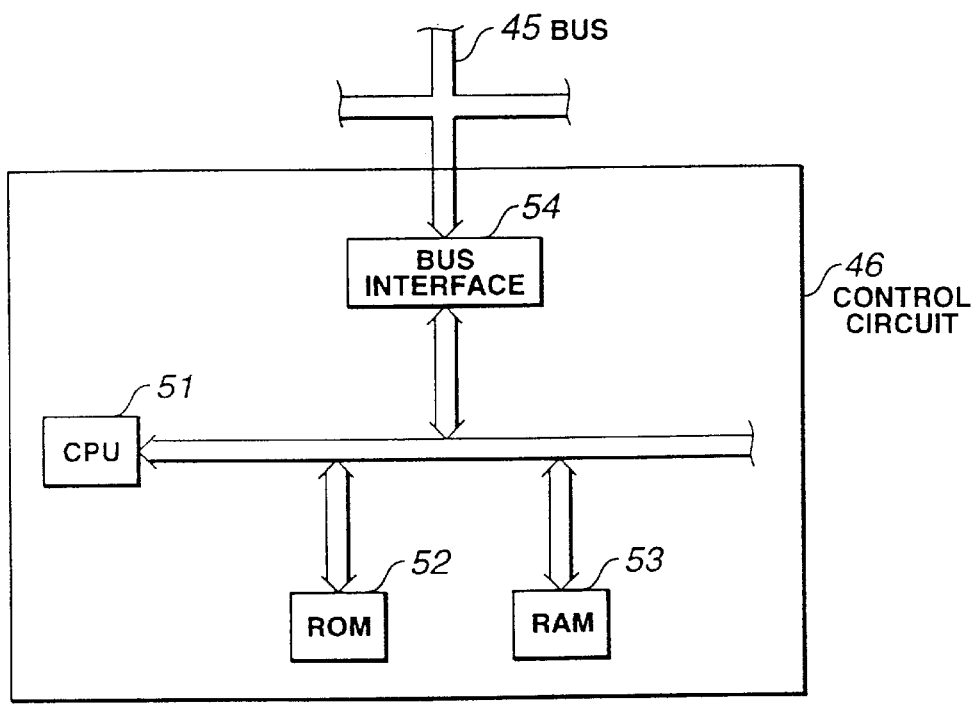
FIG. 12 is a composition diagram of a control circuit of the PBX according to the third embodiment of the present invention.

FIG. 12 shows the block diagram of a detailed composition example of the control circuit 46 mentioned above. The control circuit 46 comprises a CPU 51, a ROM 52 for storing programs and data for operating this CPU 51, a RMA 53, working memory of the CPU 51, and a bus interface 54 to be connected to the bus 45. Note that a mass storage facility such as hard disk may be connected and the programs may be stored in this hard disk.

Figure 13:
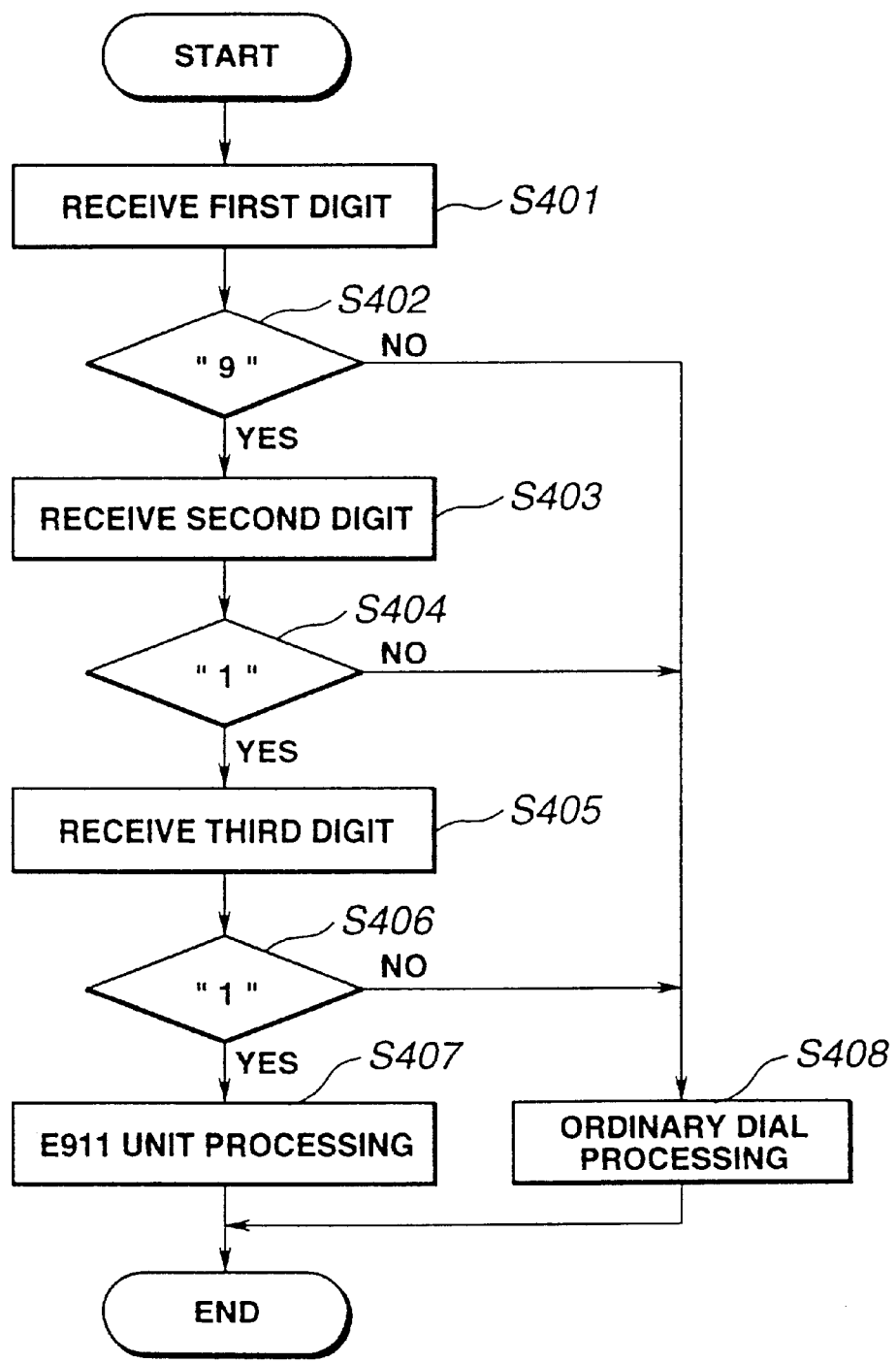
FIG. 13 is a flow chart showing the operation of the PBX according to the third embodiment of the present invention.

The control circuit 46 acts as a determination means for determining whether the dial data input form the extension terminal (digital key telephone 2 or standard telephone set 3) corresponds to "911" or not based on the program of the flow chart shown in FIG. 13 and, if it is determined to be a data corresponding to "911" by this determination, calls the E911 unit 4 from the standard telephone interface 43, and when this E911 unit 4 returns a response signal, acts also as a transmission means for transmitting the identification information of the extension telephone terminal to the E911 unit 4.

Now the processing of the control section 46 shall be described referring to FIG. 13. Suppose the emergency call be originated from the digital key telephone 2. When the first digit of the dial number is input, the control circuit receives this first digit (S401), determines if it is "9" or not (S402), and performs an ordinary dial processing if it is not "9" (S408). In the foregoing, if the first digit of the received dial number "9", the control section 46 intakes the second digit of the dial number input from the digital key telephone 2 (S403), determines whether the second digit is "1" or not (S404) and performs the ordinary dial processing if it is not "1" (S408).

If "1" is detected in the step S404, the control section 46 intakes the third digit of the dial number {input} from the digital key telephone 2 (S405), determines if the third digit is "1" or not (S406) and performs the ordinary dial processing if it is not "1" (S408). If "1" is detected in the step S404, the control section 46 performs the processing in respect of the E911 unit 4 (S407).

Now, the processing the control section 46 performs in respect of the E911 unit 4 in the step S407 will be described. Upon the detection of the transmission of the dial data "911" from the DKT interface 41, the control circuit 46 transmits a receipt signal to the standard telephone interface 43. Upon this, the standard telephone interface 43 transmits a receipt signal to the E911 unit 4. Upon the reception of the receipt signal, corresponding to this, the E911 unit 4 returns a response signal to the control circuit 46 through the standard telephone interface 43. Receiving the response signal, the control circuit 46 inquires for the extension number of the digital key telephone 2 (stored in the RAM 53) that has originated the emergency call and transmits the extension number to the E911 unit 4 through the standard telephone interface 43. The E911 unit 4 connects with the 911 Tandem office 8 and sends the extension number transmitted from the control section to the 911 Tandem office 8. Upon this, the 911 Tandem office 8 informs the firehouse or the like of the location information based on this extension number and forms a communication rout for emergency call from the digital key telephone 2 and the firehouse or the like.

Figure 14:
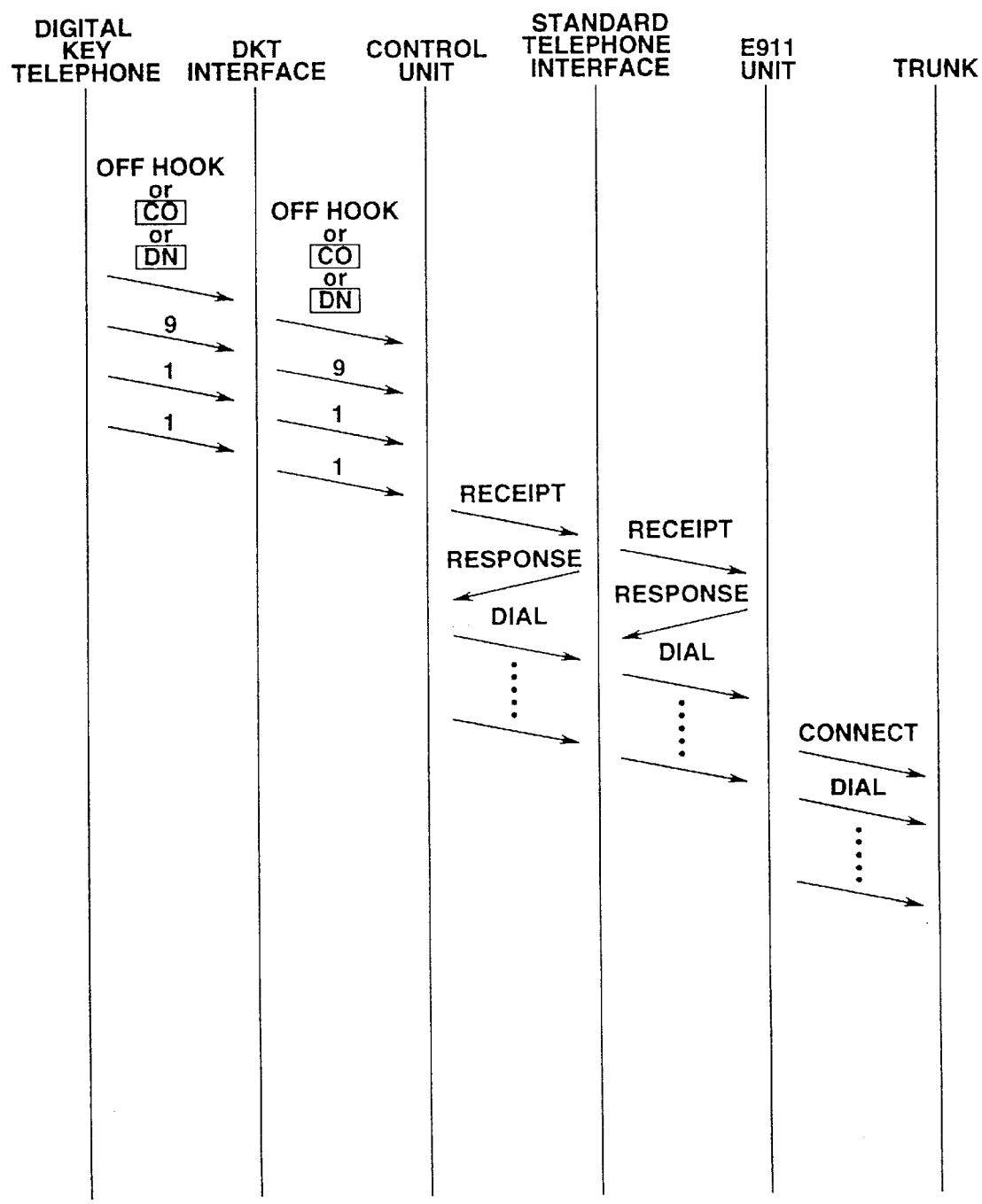
FIG. 14 illustrates the operation sequence of the PBX according to the first embodiment of the present invention.

The emergency call operation from the digital key telephone 2 mentioned above will be described according to the sequence shown in FIG. 14. Unhook the digital key telephone 2, or operate the outside line key (C0) or operate the extension key (DN), then dial-input 911. By this, through the DKT interface 41 and the bus 45, off-hook signal, outside key (C0) operation signal or extension key (DN) extension signal will be sent to the control circuit 46 and, moreover, the dial data "911" will be transmitted. By this, the control circuit 46 performs the determination of the arriving dial data according the flow chart shown in FIG. 13 as mentioned above and, depending on its result, performs the processing to E911 unit 4. In other words, upon the detection of the dial data "911" transmitted from the DKT interface 41, the control circuit 46 transmits a receipt signal to the standard telephone interface 43, the standard telephone interface 43 sends a receipt signal to E911 unit 4 and receiving the receipt signal, the E911 unit 4 returns a response signal corresponding to this. The response signal arrives at the control circuit 46 through the standard telephone interface 43 and, receiving the response signal, the control circuit 46 transmits the extension number of the digital key telephone 2 (stored in the RAM 53) that has originated the emergency call and transmits the extension number to the E911 unit 4 through the standard telephone interface 43. The E911 unit 4 connects with the 911 Tandem office 8 and sends the extension number (shown as "dial") transmitted from the control section to the 911 Tandem office 8.

Figure 15:
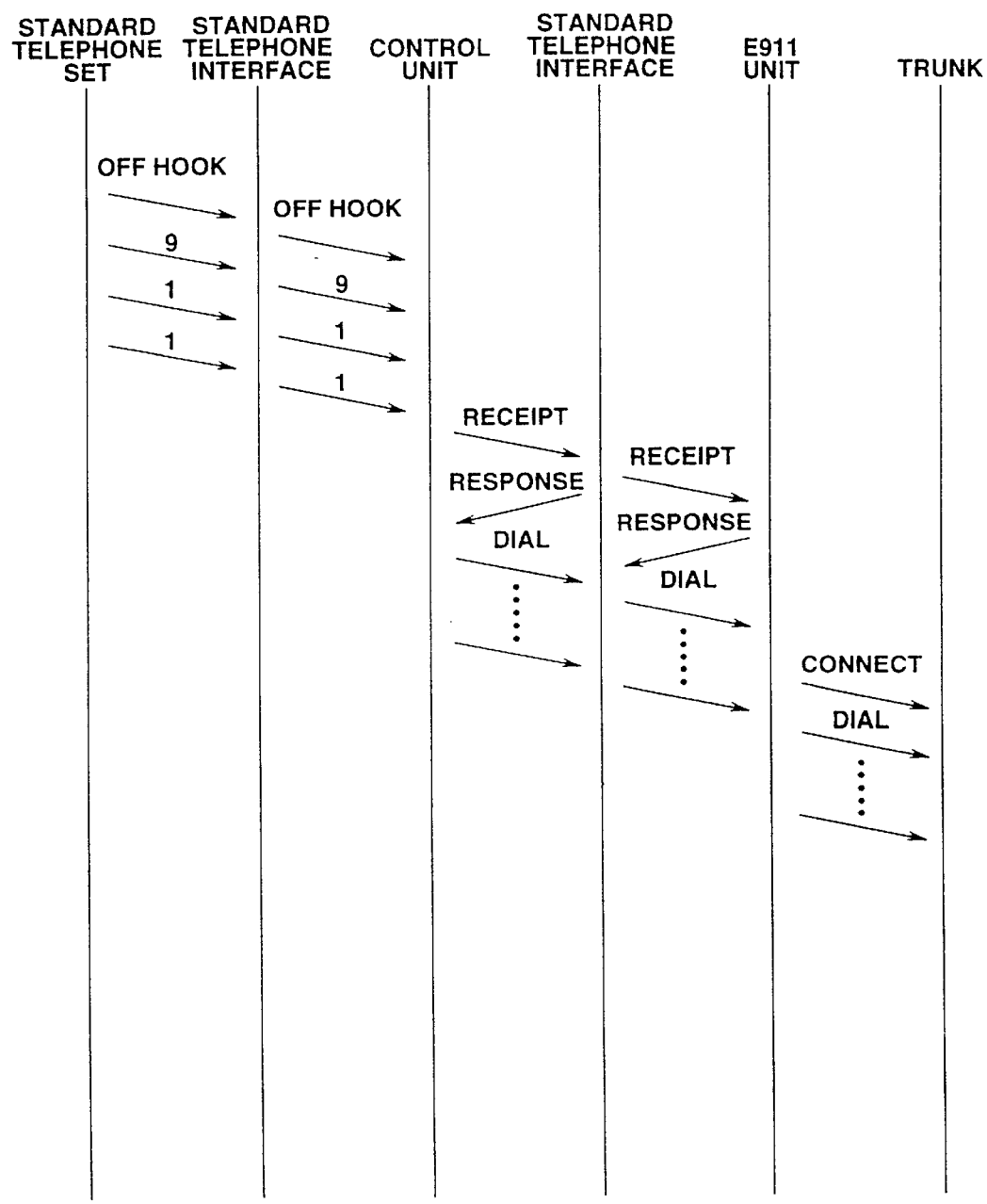
FIG. 15 illustrates the operation sequence of the PBX according to the first embodiment of the present invention.

The emergency call operation a standard telephone set 3 will be described according to the sequence shown in FIG. 15. Unhook the standard telephone set 3, then dial-input 911. By this, through the standard telephone interface 42 and the bus 45, an off-hook signal will be sent to the control circuit 46 and, moreover, the dial data "911" will be transmitted. Consequently, the control circuit 46 performs the determination of the arriving dial data according to the flow chart shown in FIG. 13 as mentioned above and, depending on its result, performs the processing to the E911 unit 4. Thereafter, the similar processing as that of the emergency call from the digital key telephone 2 described above using FIG. 14.

According to the present embodiment, the emergency call using the E911 unit 4 can be originated from the digital key telephone 2 by unhooking, or operating the station line key or operating the extension key (DN), or from the standard telephone set by inputting the dial data "911". As a consequence, even those who use the system for the first time can originate easily an emergency call through the E911 unit 4, in a way to facilitate its manipulation. Even in a hurry, they can originate the emergency call securely without fault.

Figure 16:
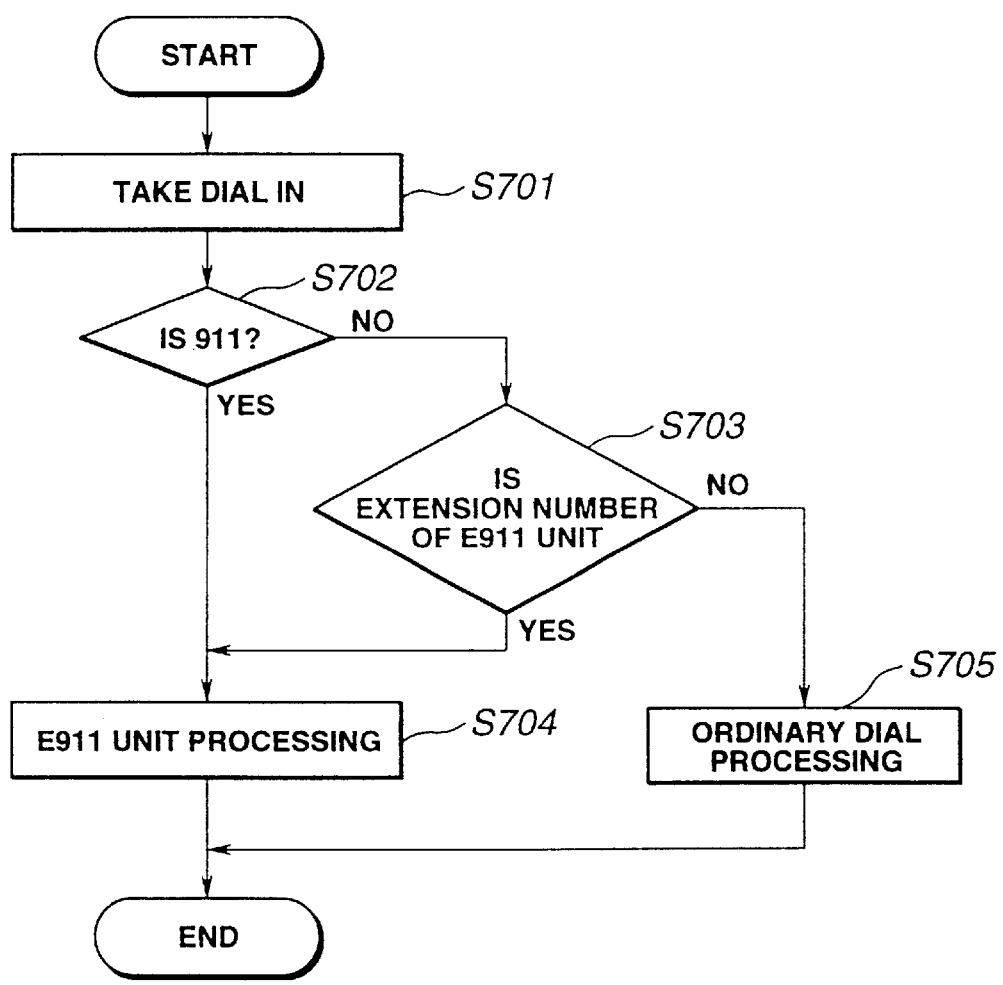
FIG. 16 is a flow chart showing the operation of the PBX according to the third embodiment of the present invention.

The PBX 40 includes a program for performing the processing of the flow chart shown in FIG. 16 to process the E911 call; so now the operation based on this flow chart will be described. Unhook the digital key telephone 2, or operate the station line key or operate the extension key, or unhook the standard telephone set, then input dial data "911"; by this, the control circuit 46 intakes the dial data "911" through the DKT interface 41 or the standard telephone interface 42 (S701) and determines whether the taken dial data is "911" or not (S702); and originates the emergency call using the E911 unit 4 if the taken dial data is "911". This processing progression is the operation described according to the flow chart shown in FIG. 13.

In addition to this, the PBX 40 performs the operation as follows. Unhook the digital key telephone 2 or operate the extension key to capture the extension, or unhook the standard telephone set 3 to capture the extension. And, dial key input the extension number of the standard telephone interface 43 to call the E911 unit 4, then the control circuit 46 branches to NO in the step S702, and determines whether the input extension number is an extension number of the standard telephone interface 43 connecting to the E911 unit 4 or not (S703). If the input extension number is an extension number of the standard telephone interface 43 connecting to the E911 unit 4, an emergency call using the E911 unit 4 shall be originated (S704).

If the user unhooks the digital key telephone 2 or the standard telephone set 3 to dial key input the extension number of the standard telephone interface 42 and, moreover, dial key inputs the extension number of their own telephone set, the control circuit 46 shall neglect the same, but transmits the extension number of the extension terminal which has originated the emergency call stored in the RAM 53 to the E911 unit 4, according to the E911 unit processing of S704.

By the composition mentioned above, the emergency call can be originated using E911 unit 4 even when the E911 unit 4 has been called directly from the extension terminal using the extension, as a variation of the emergency call through E911 unit 4, in a way to further facilitate the use.

What is claimed is:

1. A telephone exchange apparatus, comprising:
   a plurality of extension interfaces corresponding to a plurality of extension lines to which an extension telephone terminal is capable of being connected;
   a line interface to which a communication line is capable of connecting, wherein the line interface is capable of connecting via the communication line to an emergency call unit, and said same line interface is capable of connecting via the communication line to a standard telephone terminal;

determination means for determining whether dial data input from at least one extension telephone terminal is data corresponding to a given member; and transmission means for calling the emergency call unit by using the line interface when the determination means determines that the dial data is data corresponding to the given number, and for transmitting identification information of the extension telephone terminal to the emergency call unit through the line interface when a response signal is received from the emergency call unit.

2. The telephone exchange apparatus according to claim 1, wherein the determination means is activated upon receiving transmission instruction from the extension telephone terminal via an office line, and determines whether dial data input from the extension telephone terminal is data corresponding to a given number.

3. The telephone exchange apparatus according to claim 1, wherein the determination means is activated upon receiving transmission instruction from the extension telephone terminal via the extension line, and determines whether dial data input from the extension telephone terminal is data corresponding to a given number.

4. The telephone exchange apparatus according to claim 1, wherein the dial data corresponding to the given number is data of a telephone number to be used for emergency call.

5. The telephone exchange apparatus according to claim 1, wherein the transmission means further calling the emergency call unit by using the line interface when an input for instructing to connect to communications lines to which the emergency call unit is capable of being connected to is made from the extension telephone terminal, and for transmitting the identification information of the extension telephone terminal to the emergency call unit through the interface when a response signal is received from the emergency call unit.

6. A telephone exchange apparatus, comprising:

a plurality of standard telephone interfaces that are capable of interfacing either a standard telephone or an emergency call unit, wherein at least one standard telephone interface interfaces a standard telephone and at least one standard telephone interface interfaces an emergency call unit;

a control circuit for determining whether dial data input from at least one standard telephone is data corresponding to a given number, and for calling the emergency call unit via the standard telephone interface interfacing the emergency call unit when the dial data is data corresponding to the given number, and for transmitting identification information of the standard telephone to the emergency call unit when a response signal is received from the emergency call unit.

7. The telephone exchange apparatus of claim 6, further comprising:

at least one digital key telephone interface that is capable of interfacing a digital key telephone;

wherein the control circuit is further for determining whether dial data input from at least one digital key telephone is data corresponding to a given number, and for calling the emergency call unit via the standard telephone interface interfacing the emergency call unit when the dial data is data corresponding to the given number, and for transmitting identification information of the digital key telephone to the emergency call unit through the standard telephone interface when a response signal is received from the emergency call unit.

8. A telephone exchange apparatus, comprising:

at least one digital key telephone interface that is capable of interfacing a digital key telephone;

at least one standard telephone interface that is capable of interfacing a standard telephone, wherein at least one of the standard telephone interfaces interfaces an emergency call unit; and a control circuit for determining whether dial data input from at least one digital key telephone is data corresponding to a given number, and for calling the emergency call unit via the standard telephone interface interfacing the emergency call unit when the dial data is data corresponding to the given number, and for transmitting identification information of the digital key telephone to the emergency call unit through the standard telephone interface when a response signal is received from the emergency call unit.

* * * * *